United States Patent [19]

Pees et al.

[11] Patent Number: 4,567,637
[45] Date of Patent: Feb. 4, 1986

[54] METHOD OF SERVICING VEHICLE SUSPENSION STRUTS

[75] Inventors: James M. Pees, Dayton; Wayne V. Fannin, Xenia, both of Ohio

[73] Assignee: General Motors Corporation, Detroit, Mich.

[21] Appl. No.: 531,866

[22] Filed: Sep. 14, 1983

[51] Int. Cl.⁴ .............................................. B23P 7/00
[52] U.S. Cl. ................................. 29/402.08; 29/401.1
[58] Field of Search ................. 29/401.1, 402.08, 235; 267/15 A; 280/671, 690, 691, 709, 711

[56] References Cited

U.S. PATENT DOCUMENTS

| | | | |
|---|---|---|---|
| 3,346,272 | 10/1967 | Smith | 280/96.2 |
| 4,042,259 | 8/1977 | Fiedler et al. | 280/701 |
| 4,200,307 | 4/1980 | Szabo | 280/668 |

FOREIGN PATENT DOCUMENTS 2039259 8/1980 United Kingdom .

Primary Examiner—Howard N. Goldberg
Assistant Examiner—Timothy V. Eley
Attorney, Agent, or Firm—Charles R. White

[57] ABSTRACT

Suspension strut is detached from sprung portion of the vehicle and swung on lower control arm pivot to service position in which onboard repairs can be effected including change or addition of elastomer air sleeve using special inner clamping ring which is manually installed and which provides optimized clearance with respect to the dust tube allowing unrestricted reciprocating strut movements on vehicle operation subsequent to reattachment of the strut to the sprung portion of the vehicle.

3 Claims, 7 Drawing Figures

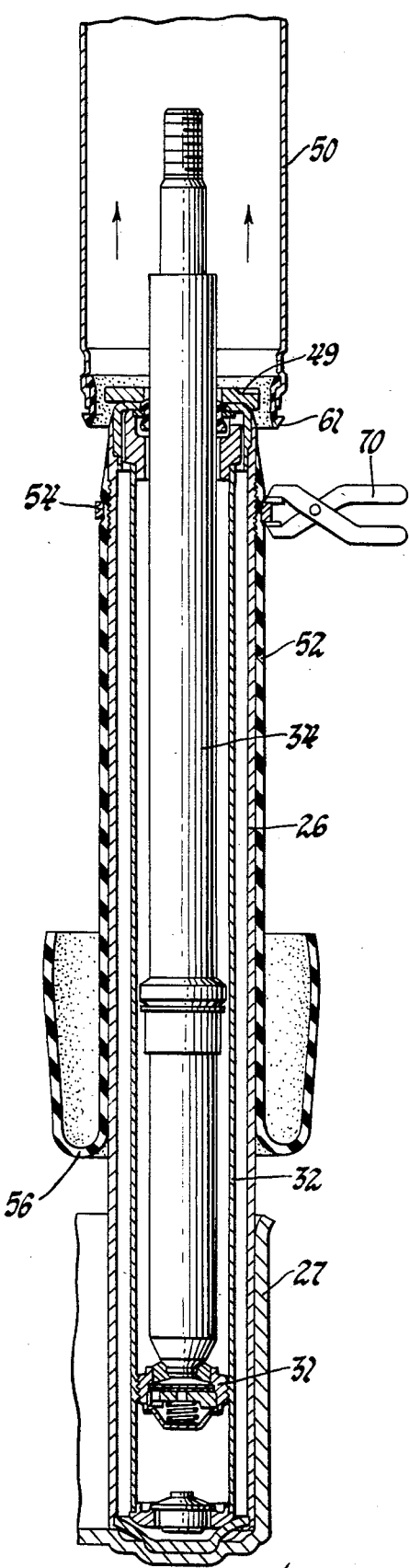
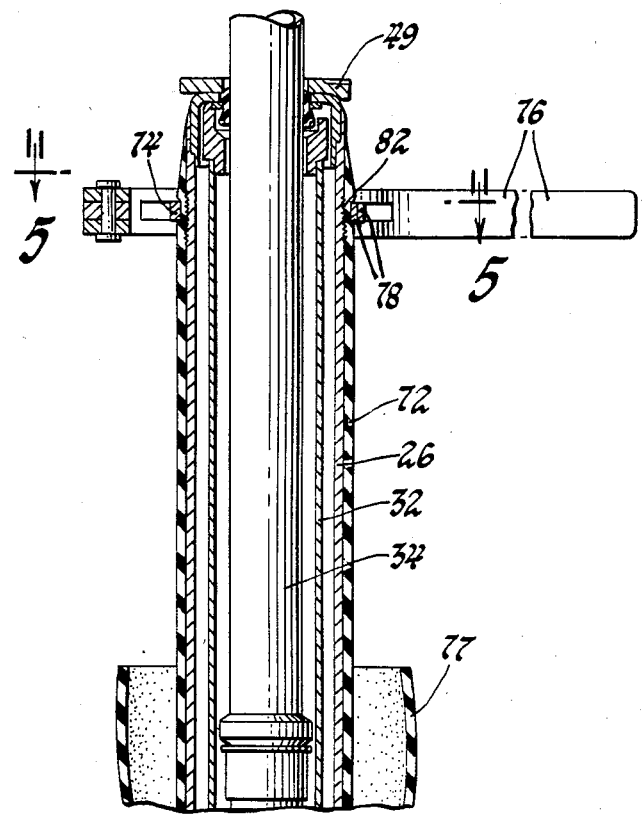
Fig. 4
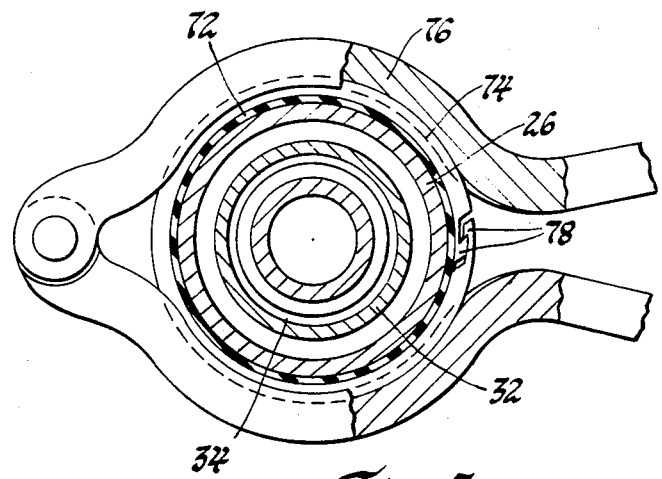
Fig. 3
Fig. 5

METHOD OF SERVICING VEHICLE SUSPENSION STRUTS

This invention relates to suspension struts for vehicles and more particularly to a new and improved method for servicing an air spring suspension strut and for converting a standard suspension strut to an air spring suspension strut.

In our copending application Ser. No. 324,490, now abandoned, filed Nov. 24, 1981 for Vehicle Suspension Unit With Replacement Air Spring, an elastomer air sleeve and mount assembly is disclosed for replacing a worn elastomer sleeve of the air spring of a suspension strut. The present invention is of the same general category but further advances the state of the art by providing simpler new and improved procedures, methods and constructions for servicing an air adjustable suspension strut or for adding an air spring to a conventional strut.

The present invention optimizes the installation of an air sleeve onto a support tube of the strut since only simple parts and hand tools are required to repair, rebuild or modify struts. With this invention, persons having moderate skills are able to effect strut repair or rebuild.

This invention further provides a new and improved method of onboard servicing of an air spring suspension strut in which the strut is unbuckled only from its connection with the sprung portion of the vehicle, telescopically collapsed and turned on a lower pivot connection to an unsprung portion of the vehicle to a service position. In this strut position and while attached to the unsprung portion vehicle, the upper mount is removed from the strut and an outer clamp securing the lower end of the elastomeric air sleeve to the dust tube of the strut is severed. This allows the axial removal of the dust tube from the strut assembly to expose an inner clamp securing the sleeve to the support tube of the strut. This inner clamp is subsequently severed by conventional tooling to permit axial removal of the worn elastomeric sleeve from the strut. The worn sleeve is discarded and a replacement elastomer air sleeve is installed over the support tube of the strut. Subsequently a specialized inner clamp ring having a constant diameter and providing optimized dust tube clearance may be installed with simple hand tooling to secure the sleeve to the support tube so that it is airtight and will not interfere with the internal wall of the dust tube. After the replacement sleeve is attached to the support tube, the dust tube assembly is reinstalled on the piston rod of the strut. The lower end of the air sleeve is fitted around the lower end of the dust tube and attached thereto by a conventional or specialized hose clamp to provide an airtight connection After the replacement air sleeve is installed on the strut, the upper mount is reinstalled on the piston rod of the strut and the strut is returned to an upright position. The upper mount is then reattached to the sprung portion of the vehicle. Since the mount position has not been changed, wheel alignment adjustments are not necessary. A conventional strut can be converted to an air adjustable strut with the addition of an air sleeve as described above. Conventional systems are employed for adjusting the air pressure in such conversion so that load leveling is assured.

In one preferred service procedure, the road wheel is removed from the spindle assembly after the associated control arm is elevated by a conventional jack. The strut is then detached from its upper connection with the vehicle and pivoted to the service position. The air sleeve is changed or added in the conversion as stated above. The strut is then swung to its upright position and reconnected by the upper mount to the vehicle body. The road wheel is subsequently remounted to the wheel spindle assembly and the jack removed so that the vehicle is ready for use.

These and other features, objects and advantages of this invention will be more apprent from the following detailed description and drawing in which:

FIG. 3 is a cross-sectional view of the strut shown in FIGS. 1 and 2 being dismantled for service.

FIG. 4 is a view of a portion of the strut of FIG. 3 illustrating installation of a new elastomeric air sleeve onto the strut.

FIG. 5 is a sectional view taken along lines 5—5 of FIG. 4 illustrating installation of the clamp ring for securing the air sleeve to the strut.

Figures 1, 2:
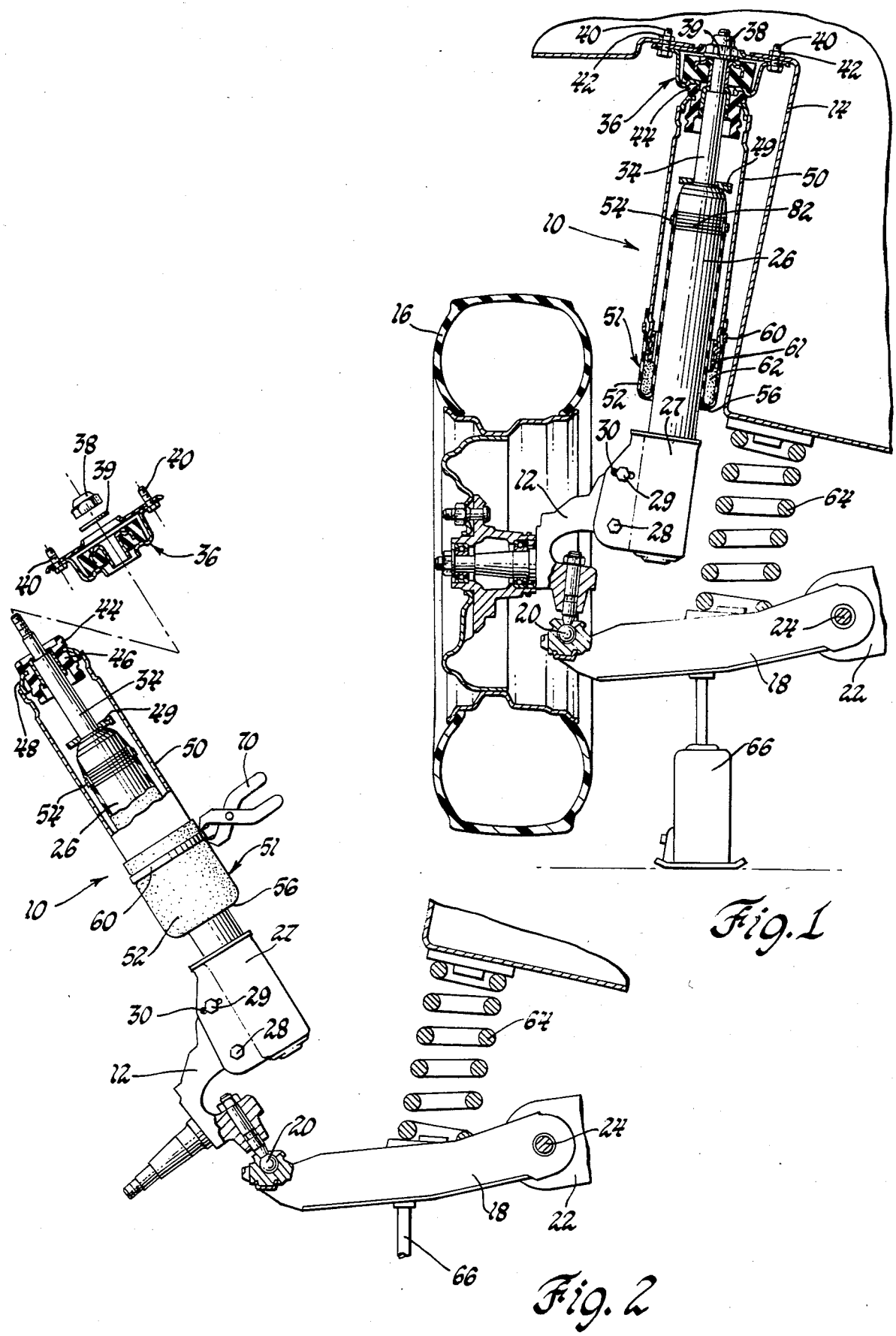
FIG. 1 is an end view partially in section of a portion of a vehicle including a suspension strut operatively mounted between the road wheel assembly and the vehicle body.
FIG. 2 is a view similar to FIG. 1 showing the strut detached from the vehicle body and swung to a service position.

Turning now in greater detail to the drawing, FIG. 1 shows an air adjustable suspension strut 10 operatively mounted between a wheel spindle and hub assembly 12 and a mounting tower 14 formed in the bodywork of a vehicle. The spindle and hub assembly 12 rotatably supports a pneumatic road wheel assembly 16 in a conventional manner and is in turn supported on the outer end portion of a control arm 18 by ball joint 20. The control arm 18 is pivotally mounted at its inboard end to the vehicle frame 22 or other supporting component by pivot shaft 24.

The strut has a cylindrical outer support tube 26, usually the reservoir tube, mounted at its lower end within a cylindrical bracket 27. The bracket 27 is attached by bolts 28, 29 to the spindle and hub assembly 12. Wheel 16 can be pivoted on bolt 29 and secured in selected position by tightening bolt 29 positioned in lateral slot 30 in the hub assembly 12 for camber adjustment. The strut 10 is either a "wet build" or "cartridge build" unit such as described in U.S. Pat. No. 4,276,971 issued July 7, 1981 to R. A. Horvath for Vehicle Suspension Strut With Serviceable Shock Absorber and assigned to the assignee of this invention and hereby incorporated by references.

The strut 10 accordingly has conventional shock absorber components therein and includes a valved piston 31 reciprocally movable within an oil filled cylinder tube 32 in the strut. A tubular piston rod 34, extending upwardly from the piston through the capped upper end of the support tube, is attached to the tower 14 by an upper mount 36. The end of the piston rod 34 is threaded to receive a nut 38 which, in cooperation with flat washer 39, secures the mount to the piston rod. The mount is removably secured to the sheet metal tower 14 by attachment bolts 40 that extend through a flanged portion of the mount and through the tower sheet metal work to receive the nuts 42.

Mounted adjacent to the upper end of the piston rod 34 and on a shouldered portion thereof is a jounce bumper assembly 44 described in copending application Ser. No. 521,062, now U.S. Pat. No. 4,527,781 for Pneumatic Vehicle Suspension Unit With Air Sleeve Guide filed Aug. 8, 1983 and application Ser. No. 550,795 for Compliant Cover Plate filed Nov. 14, 1983 both application being assigned to the assignee of this invention and hereby incorporated by reference.

The jounce bumper assembly 44 is separable from the upper mount 36 as best illustrated in FIG. 2 and includes a cylindrical elastomer bumper element 46 bonded at its internal diameter to a metallic mounting cap 48 which is seated on the shouldered portion of the rod and is retained in this position by the upper mount 36 when the piston rod nut 38 has been threadedly fastened onto the end of the piston rod 34. The jounce bumper element 46 is a resilient cushion to be contacted and deflected by a bumper plate 49 welded or otherwise secured to the top of the support tube to check and cushion severe jounce motions. A cylindrical dust tube 50 extends from attachment with the jounce bumper assembly downwardly around and in concentric relationship to the support tube 26. Strut 10 incorporates an air suspension spring 51 provided by a generally cylindrical elastomer sleeve 52 having its inner and upper end connected to the upper end of the support tube by an annular steel clamping ring 54. This ring is factory installed and is constricted mechanically or magniformed to ensure air sealing. From clamping ring 54, the elastomeric air sleeve closely follows the contour of the cylindrical support tube 26 and is reversely curved intermediate the ends thereof to form rolling lobe 56. From rolling lobe 56 the sleeve 52 extends upwardly to a large diameter terminal end fitted and around the lower end of the dust tube 50. A second continuous clamping ring 60, similar to clamping ring 54, is employed to secure the elastomeric sleeve to the lower end of the dust tube in an airtight manner.

The annular plastic guard element 61 carried by the end of dust tube prevents abrasion of the sleeve during operation and is more fully described in patent application Ser. No. 521,062, cited above.

The pneumatic chamber 62 formed by the dust tube 52, the support tube 26, the elastomer air sleeve 52 and other components may be charged with a pressurized air to provide a pneumatic spring for vehicle suspension purposes including load leveling. The system for controlling and varying the pressure within the air spring of this unit may be like that disclosed in U.S. Pat. No. 3,372,919 to G. W. Jackson for Automatic Vehicle Leveling System assigned to the assignee of this invention and hereby incorporated by reference.

Operatively mounted between the control arm 18 and the vehicle body is a helical suspension spring 64 supporting the vehicle body. Spring action is damped or checked by the shock absorber within the strut 10 to enhance vehicle ride. For vehicle leveling, the air spring 51 mounted in parallel with respect to spring 62 is pressurized with air in accordance with load conditions to provide spring assist in leveling the vehicle body.

In the event that the air spring 51 has a worn sleeve 52 or other component including internal component of the strut that requires service, this invention provides for the "onboard" repair.

In a preferred embodiment, a jack 66 is placed by the mechanic beneath the control arm 18 and the wheel assembly is raised by the jack allowing road wheel 16 to be removed. After road wheel removal, the nuts 42 are removed from the upper mount and the strut 10 is telescopically collapsed to a position in which there is sufficient clearance beneath tower 14 so that the strut can be turned on the ball joint 20 to the service position shown in FIG. 2. This telescopic collapse is not illustrated in the drawings. At the service position, nut 38 is removed from the piston rod so that the upper mount can be removed. The outermost lower clamping ring 60 connecting the sleeve to the dust tube is severed by a conventional cutting tool 70.

After the lower ring is severed and removed, the dust tube assembly is axially removed along with the jounce bumper assembly 44 from the remainder of the strut as best shown in FIG. 3 to provide access to the inner clamping ring 54. The inner clamping ring 54 now exposed is then manually severed using the cutting tool 70 so that the sleeve can be axially removed from the reservoir tube of the strut and discarded. A new air sleeve 72, which is the same construction as the worn sleeve, is installed over the support tube as in FIG. 4. A steel clamp ring 74 of constant thickness and diameter is manually installed preferably using the pliers 76 for holding the clamping ring 74 and positioning it in place as shown in FIG. 4. The handles of the pliers are manually gripped to constrict ring 74 so that the hooked ends 78 are cammed into the interlocked position of FIG. 5 to thereby seal the upper end of the new air sleeve 72 to the support tube 26.

With the clamping ring 74, there is substantially 360° circumferential contact with the air sleeve for assured sealing and adequate outer diametrical clearance with respect to the inner wall of the dust tube on jounce and rebound stroke to prevent scraping and wear. A series of annular grooves 82 are formed in the support tube to receive the deflected material of the air sleeve and to provide improved retention of the air sleeve on the support tube. After clamping ring 74 has been installed, the dust tube assembly 44 is reinstalled over the reservoir tube with jounce bumper 46 mounted on the piston rod. The large diameter lower end 77 of the air sleeve is thus fitted over the lower end of the dust tube. A lower clamping ring, which can be like that of FIG. 5, but of an increased diameter to accommodate the dimensions of the dust tube is then installed around the lower end of the sleeve 72 to complete installation thereof. The upper mount 36 is then added onto the upper end of the piston and is secured thereon by the nut 38. With this being accomplished, the strut can be returned to its FIG. 1 position and extended so that the mounting bolts 38 project through the bolt openings in the mounting tower. The nuts 42 are subsequently turned on bolts 38 to secure the strut in position. The wheel assembly is then reinstalled on the wheel spindle assembly and the jack 66 retracted and removed allowing the vehicle to be driven subsequent to the recharging of the pneumatic chamber of the suspension as required by load conditions.

Figure 6:
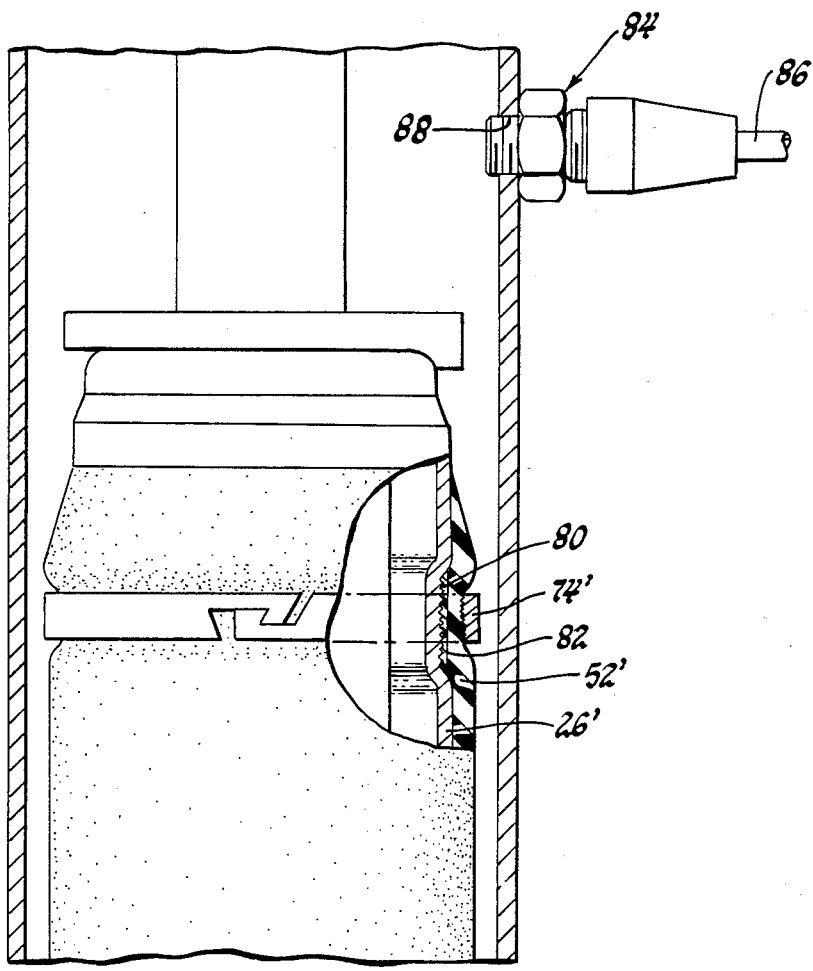
FIGS. 6 and 7 are partial, cross-sectional views illustrating various constructions for securing an air sleeve to the strut.

For conversion of a conventional strut, the elastomeric sleeve can be installed as explained above. In the clamping arrangement of FIG. 6, the support or reservoir tube 26' of a standard strut or shock absorber to be converted to an air adjustable unit is formed with a ridged annular groove 80 to accommodate the deflected material of an elastomeric air sleeve 52'. This groove construction assists in the retention of the sleeve on the reservoir tube 26' to improve conversion of the unit to an air spring unit. A thin annular layer 82 of a suitable adhesive and sealant may be used in the ridged groove 80 to improve the air sealing between the reservoir tube and the air sleeve. A clamping ring 74' like that of FIG. 5 is installed as described above to secure the air sleeve to the reservoir tube. A conventional air fitting 84 to receive air line 86 such as disclosed in U.S. Pat. No. 3,332,708 issued Jul. 25, 1967 to Jackson et al for Tube Coupling Having Deformable Gripping and Sealing Means, is installed through an opening 88 made in the dust tube for connection with the control system.

Figure 7:
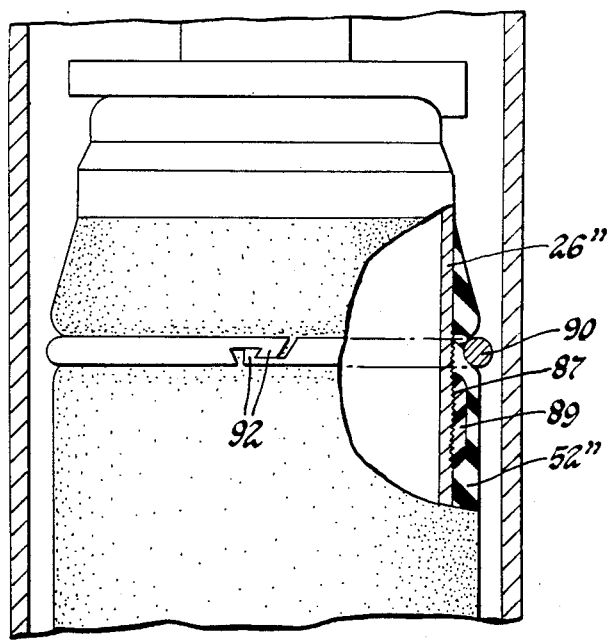

In FIG. 7, a plastic anti-slip ring 89 is installed between the air sleeve 52'' and ridged section 87, the reservoir tube 26''. A wire clamp ring or retainer 90 of circular cross-section and having interlocking hooked ends 92 like those of clamp ring 74 is installed with the pliers 76 to secure the sleeve to the reservoir tube.

With this invention, there is an improved service since the strut does not have to be removed from the vehicle. Since the upper mount is returned to its original position and since camber adjustment bolts are not disturbed, no wheel alignment is normally required. Furthermore, this invention provides for the conversion of a standard strut to an air spring assist strut using simple hand tools and components described and air strut components. In the service position, other work can be performed on the strut including changing the cartridges or converting the strut from a wet build unit to a cartridge unit as described in the patent to Horvath et al cited above.

While a preferred embodiment of the invention has been shown and described to illustrate the invention, other modifications will now become more apparent to those skilled in the art. Accordingly, the scope of this invention is set forth in the following claims.

The embodiments of the invention in which an exclusive property or privilege is claimed are defined as follows:

1. A method of servicing an air spring suspension strut including a hydraulic shock absorber, a support tube having said shock absorber operatively mounted therein, said shock absorber having a piston and piston rod assembly, a dust tube connected to the piston rod and extending around said support tube, an air spring comprising a tubular sleeve of rubber-like material having one end connected by first encircling clamp means to said support tube and the other end connected to said dust tube by second encircling clamp means comprising the steps of releasing the second clamping means from connection of the sleeve with the dust tube, removing the dust from said strut and from the lower end of said sleeve to uncover the first clamp means, releasing said first clamp means from connection of said sleeve with said support tube, removing said sleeve from said strut, inserting a replacement tubular sleeve of rubber-like material on the strut with the inner end disposed around the support tube, installing an inner clamp means around the inner end of the replacement sleeve with hand tools so that it is connected in an airtight manner to said support tube, reinstalling the dust tube, extending the replacement sleeve so that the outer end thereof and compasses the lower end of said dust tube, installing an outer clamp means around the outer end of said replacement sleeve so that it is attached to the dust tube in an airtight manner to form a pneumatic chamber, and subsequently charging said pneumatic chamber with a charge of pressurized air.

2. A method of servicing an air spring suspension strut having a hydraulic shock absorber, operatively mounted in a support tube, the strut also having a piston and piston rod assembly, a dust tube connected to the piston rod and extending around said support tube, an air spring comprising an original tubular sleeve of rubber-like material having one end connected by first encircling clamp means to the support tube and the other end connected to said dust tube disposed around the outer support tube by second encircling clamp means comprising the steps of releasing the second clamping means from connection of the original tubular sleeve with the dust tube, removing the dust tube from said strut and the lower end of said original tubular sleeve to uncover the first clamping means, releasing the first clamping means from connection of the original tubular sleeve with the support tube, removing the original tubular sleeve from the strut, inserting a replacement tubular sleeve of rubber-like material on the strut with the inner end disposed around the support tube, installing an inner clamp means around the inner end of the replacement sleeve with hand tools so that it is connected in an airtight manner to the support tube, reinstalling the dust tube on the strut, installing the free end of the replacement sleeve around the lower end of said dust tube, installing an outer clamp means around the outer end of said replacement sleeve so that it is attached to the dust tube in an airtight manner to complete replacement of the original sleeve.

3. An on-vehicle method of servicing an air spring suspension strut having an outer support tube extending upwardly from a road wheel and a wheel mounting knuckle assembly that is mounted by a ball joint to a lower control arm, the strut further having a hydraulic shock absorber operatively mounted in said support tube with a piston and rod assembly operately connected at its outer end by a top mount to support structure in the vehicle body, the air spring being a pressurized cylindrical sleeve of rubber-like material having one end connected by first encircling clamp means to the support tube and the other end connected to a dust tube disposed around the outer support tube by second encircling clamp means comprising the steps of releasing the top mount from securement with the support structure to thereby unbuckle the upper portion of the strut from the vehicle body, jacking said road wheel with respect to the vehicle body until the vehicle suspension load is removed from said suspension strut, removing said road wheel from said knuckle assembly, swinging the suspension strut on said ball joint outwardly of the vehicle body to thereby expose the strut for service, releasing the second clamping means from connection of the air sleeve with the dust tube, removing the dust tube, subsequently releasing the first clamping means from connection of the air sleeve with the support tube, removing the air sleeve from the strut, inserting a replacement air sleeve on the strut with the inner end disposed around the support tube, installing an inner clamp means around the inner end of the air sleeve so that it is connected in an airtight manner to the support tube, reinstalling the dust tube, inserting the free end of the dust tube in the free end of the air sleeve installing an outer clamp means around the outer end of said air sleeve so that it is attached to the dust tube in an airtight manner, pivoting the strut back to an upright position and reattaching the top mount with the support structure of the vehicle body to thereby complete replacement and service of the air spring of said suspension strut.

* * * * *